US010732291B2

(12) United States Patent
Capet et al.

(10) Patent No.: US 10,732,291 B2
(45) Date of Patent: Aug. 4, 2020

(54) MULTIPATH MITIGATION IN A GNSS RADIO RECEIVER

(71) Applicant: CENTRE NATIONAL D'ETUDES SPATIALES, Paris (FR)

(72) Inventors: Nicolas Capet, Toulouse (FR); François-Xavier Marmet, Muret (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 338 days.

(21) Appl. No.: 15/846,452

(22) Filed: Dec. 19, 2017

(65) Prior Publication Data

US 2018/0180742 A1 Jun. 28, 2018

(30) Foreign Application Priority Data

Dec. 22, 2016 (EP) .................................... 16306785

(51) Int. Cl.
*G01S 19/22* (2010.01)
*G01S 19/36* (2010.01)

(52) U.S. Cl.
CPC .............. *G01S 19/22* (2013.01); *G01S 19/36* (2013.01)

(58) Field of Classification Search
CPC .......... G01S 19/22; G01S 19/28; G01S 19/29; G01S 19/36; G01S 19/38
See application file for complete search history.

(56) References Cited

U.S. PATENT DOCUMENTS

2009/0195449 A1 8/2009 Bedell

FOREIGN PATENT DOCUMENTS

WO 99/57572 A1 11/1999

OTHER PUBLICATIONS

European Search Report for 16306785.3 dated Jul. 7, 2017.
Groves P D et al: "Novel Multipath Mitigation Methods using a Dual-Polarization Antenna", GNSS 2010—Proceedings of the 23rd International Technical Meeting of the Satellite Division of the Institute of Navigation (ION GNSS 2010), The Institute of Navigation, 8551 Rixlew Lane Suite 360, Manassas, VA 20109, USA, Sep. 24, 2010 (Sep. 24, 2010), pp. 140-151.

(Continued)

*Primary Examiner* — Dao L Phan
(74) *Attorney, Agent, or Firm* — Meagher Emanuel Laks Goldberg & Liao, LLP

(57) ABSTRACT

A GNSS receiver, and an associated method are presented for calculating a position from positioning signals transmitted by a plurality of GNSS transmitters. For example the receiver compsises a first and a second signal acquisition elements having different polarizations, the receiver being configured to process the signals received on the first signal acquisition element to calculate first pseudo range measurements, and the signals received on the second signal acquisition element to calculate second pseudo range measurements and associated quality indicators. The receiver further comprises a calculation circuit configured to select at least one of the second pseudo range measurements depending on the quality indicators, and compare it with the corresponding first pseudo range measurement, and select at least three first pseudo range measurements based on the comparison results to calculate a position.

11 Claims, 6 Drawing Sheets

(56) References Cited

OTHER PUBLICATIONS

Groves P D et al: "A Portfolio Approach 1-11 to NLOS and Multipath Mitigation in Dense Urban Areas", GNSS 2013—Proceedings of the 26th International Technical Meeting of the Satellite Division of the Institute of Navigation (ION GNSS+2013), The Institute of Navigation, 8551 Rixlew Lane Suite 360, Manassas, VA 20109, USA, Sep. 20, 2013 (Sep. 20, 2013), pp. 3231-3247.

Maqsood & al., "Effects of Ground Plane on the Performance of Multipath Mitigating Antennas for GNSS", 2010 Loughborough Antennas & Propagation Conference, Nov. 8-9, 2010.

| RHCP | Ant. Gain | Att. |
|---|---|---|
| $S_{sat1}^{Diff}$ | H | H |
| $S_{sat1}^{R}$ | M | H |
| $S_{sat2}^{D}$ | VH | L |
| $S_{sat3}^{D}$ | VH | L |
| $S_{sat3}^{R}$ | H | M |
| $S_{sat4}^{D}$ | H | H |
| $S_{sat4}^{R}$ | M | M |
| $S_{sat5}^{D}$ | VH | L |

| LHCP | Ant. Gain | Att. |
|---|---|---|
| $S_{sat1}^{Diff}$ | M | H |
| $S_{sat1}^{R}$ | H | H |
| $S_{sat2}^{D}$ | VL | L |
| $S_{sat3}^{D}$ | VL | L |
| $S_{sat3}^{R}$ | VL | M |
| $S_{sat4}^{D}$ | M | H |
| $S_{sat4}^{R}$ | H | M |
| $S_{sat5}^{D}$ | L | L |

FIG.4b

| RHCP | Tracked |
|---|---|
| $S_{sat2}^{D}$ | X |
| $S_{sat3}^{D}$ | X |
| $S_{sat5}^{D}$ | X |
| $S_{sat3}^{R}$ | |
| $S_{sat4}^{R}$ | X |
| $S_{sat4}^{D}$ | |
| $S_{sat1}^{Diff}$ | X |
| $S_{sat1}^{R}$ | |

| LHCP | Tracked |
|---|---|
| $S_{sat4}^{R}$ | X |
| $S_{sat1}^{R}$ | X |
| $S_{sat5}^{D}$ | X |
| $S_{sat1}^{Diff}$ | |
| $S_{sat2}^{D}$ | X |
| $S_{sat3}^{D}$ | X |
| $S_{sat4}^{D}$ | |
| $S_{sat3}^{R}$ | |

FIG.4c

| RHCP | Quality |
|---|---|
| $PR^D_{sat2}$ | H |
| $PR^D_{sat3}$ | H |
| $PR^D_{sat5}$ | H |
| $PR^R_{sat4}$ | M |
| $PR^{Diff}_{sat1}$ | M |

| LHCP | Quality |
|---|---|
| $PR^R_{sat4}$ | M |
| $PR^R_{sat1}$ | M |
| $PR^D_{sat5}$ | L |
| $PR^D_{sat2}$ | L |
| $PR^D_{sat3}$ | L |

|  | Δ Quality |
|---|---|
| $PR_{sat1}$ | L |
| $PR_{sat2}$ | H |
| $PR_{sat3}$ | H |
| $PR_{sat4}$ | L |
| $PR_{sat5}$ | H |

FIG.4e

MULTIPATH MITIGATION IN A GNSS RADIO RECEIVER

FIELD OF THE INVENTION

The present invention applies to the field of Global Navigation Satellite Systems (GNSS) receivers in multipath propagation environments. More specifically, the invention describes a receiver architecture and related signal processing technique for multipath mitigation.

BACKGROUND PRIOR ART

There are two GNSS which have been fully deployed for a number of years (the US Global Positioning System and the Russian GLONASS) and two more which are under deployment (the Chinese Beidou Navigation Satellite System and the European Galileo system). These systems provide an accurate positioning measurement relying on the same principles: microwave radio frequency (RF) signals are broadcast on the same carrier frequency from a number of satellites which orbit; the signals carry a navigation message which are spread using a PRN (Pseudo Random Noise), the PRN sequence being specific to each transmitter. On the receiver side, the received signals are correlated in tracking loops with locally generated replica of the PRN code, in order to determine the origin of the signals and acquire a tracking position. The processing capabilities of the receivers use the information contained in the navigation message along with the reception time of the message to calculate pseudo-ranges, which are measurements of the distance between the receiver and the satellites. When four or more pseudo-range measurements are calculated from distinct satellites, the receiver can calculate a position, velocity and time (PVT), using a triangulation method or more advanced techniques as for instance the RAIM techniques (Receiver Autonomous Integrity Monitoring).

Among the various phenomena that impact the accuracy the positioning in a GNSS system is the problem of the multipath reflections. Indeed, in GNSS positioning systems, the positioning signals are transmitted via satellites that are usually in line of sight (LOS) with receivers. Thus, at the receiver side, the signal comprises a direct propagation path. However, depending on the propagation environment, it can further comprise paths known as multipaths that results from reflections of the positioning signal over the elements of the environment. These paths are delayed versions of the direct path, which generally come attenuated and phase shifted.

The multipaths create artifacts in the correlation function calculated at the receiver, and consequently affect the pseudo range measurements. Depending on the propagation environment and/or antenna performances, these multipaths can have a power level that is close to, and sometimes higher than, the power level of the direct path. When the tracking loop of the receiver locks on a reflected path instead of the direct path, and as, by definition, the reflected path covers a higher distance than the direct path, it results in a pseudo range measurement error, and consequently in a lower accuracy of the position determined by the receiver.

Tracking a reflected path instead of the direct path can happen frequently, in particular in urban environments, where a high accuracy is required. It is therefore important that GNSS receivers implement techniques to prevent from tracking reflected propagation paths instead of the direct propagation path.

It is known that the polarization of a circularly polarized electromagnetic wave is inverted when the wave is reflected. Thus, to bring robustness against multipaths to the receivers, right hand circularly polarized (RHCP) signals are commonly used. After being reflected, the signal is left hand circularly polarized (LHCP). Using RHCP antennas in the receivers, the power level of LHCP signals, i.e. signals reflected an odd number of times, is greatly decreased. The probability that the receiver tracks a reflected path of the positioning signal is reduced, which brings to the receiver an intrinsic protection against multipath reflections.

Currently, GNSS signals are transmitted using RHCP signals, and most of the receivers embed RHCP antennas, which are sufficient to handle a large number of multipath propagation scenarios. However, the efficiency of this technique highly depends on the quality of the receiving antenna diagram, and some propagation environments, notably in dense urban environments, might still be an issue.

FIG. 1 illustrates a radiation pattern of an antenna in a GNSS receiver as known from prior art. In FIG. 1 are represented the gain of the antenna with respect to the off-boresight angle (OBA), in right hand and left hand circular polarization. Off-boresight angle is expressed with respect to the antenna lighting the zenith direction, an Off-boresight angle of 0° corresponding thus to a vertical up direction of the antenna pattern.

Line 101 represents the gain for a co-polarized electromagnetic wave (in that case, RHCP), namely the gain when the received signal is right hand circularly polarized. It can be observed that the gain is maximal when the signal comes from above the receiver (the off-boresight angle is null). This perfectly suits satellite communications. The gain decreases when the off-boresight angle increases, and is close to zero when the signal comes from the back of the antenna.

Conversely, line 102 represents the gain for the cross-polarized signal, namely the gain when the received electromagnetic wave is LHCP. This gain is rather low when the off-boresight angle is null, and does not reach high values, whatever the off-boresight angle.

In FIG. 1, when the satellite is situated above the receiver (position 103), the gain difference between the right hand and left hand circularly polarized signals is of about 40 dB, which brings a natural protection against reflected propagation paths. This difference decreases conversely to the off-boresight angle. When the off-boresight angle is of about ±90° (meaning that the signal comes almost horizontally, position 104), the difference is of about 10 dB, which is not sufficient to significantly attenuate the reflected propagation paths. When the off-boresight angle is of about ±140° (position 105), this difference is null, and even inverted when the signal comes from a higher angle. There is therefore an issue when the signals come with a high off-boresight angle (this situation generally referred as the signal coming at the rear of the antenna).

In practice, the direct propagation path does not arrive with high off-boresight angles, but reflected paths can do so, for instance when the signal is reflected on the ground. In those cases, the power level of the direct and reflected paths can be equivalent, and the polarization property of the antenna does not play its role of filtering the reflected propagation paths.

It is known, as for instance from MAQSOOD & al., "Effects of Ground Plane on the Performance of Multipath Mitigating Antennas for GNSS", 2010 Loughborough Antennas & Propagation Conference, to modify the antennas, and particularly their ground plane, to further improve their gain concerning RHCP electromagnetic waves, and to decrease their gain for LHCP electromagnetic waves. Such modifications reduce but do not entirely solve the multipaths problem, and have a cost in terms of complexity, surface and cost of the antenna, which can be an issue for uses in mobile equipments.

Signal processing mitigation algorithms to detect multipath reflections in a positioning signal are also known in the art. Methods to detect multipaths in a GNSS signal comprise methods based on a Maximum Likelihood (ML) estimation of the cross-correlation functions calculated in the tracking loops of the receiver, or the Multipath Estimating Delay-Lock-Loop (MEDLL) method, that aims at estimating the delay and power of all the paths of a signal by studying the shape of the cross-correlation functions. However, these algorithms require a lot of computation power, as many correlators are required, and are sensitive to Gaussian noise. In addition, characterizing the direct path from the reflected path using such algorithms usually requires smoothing consecutive measurements over a period of time, which does not fit with time-varying environments, as for instance for a non-static receiver in a urban environment.

The use of array-antennas is also known for multipath mitigation, but requires many additional antennas and complex signal processing algorithms.

There is therefore a need for a multipath mitigation technique in a GNSS receiver that is robust, and that can be executed in real time, with a low complexity.

US patent application US 2009/0195449 A1 describes a method for determining whether the receiver is in a multipath propagation environment or not. In this patent application, pseudo ranges calculated from signals received on the RHCP antenna are compared with pseudo ranges calculated from signals received on the LHCP antenna. Carrier over Noise ratio measurements (C/NO) are also performed over the signals received on both antennas.

The referenced patent application is based on the following premises:
- when the signal only propagates through a direct path, tracking loops associated to the LHCP and RHCP signals are locked at the same position: the pseudo range measurements are substantially equals;
- when the signal comprises one or more reflections, the tracking loops dedicated to the signal acquired on the RHCP antenna are locked on the direct path of the signal, while the tracking loops dedicated to the signal acquired on the LHCP antenna are locked on the reflected path of the signal: the pseudo range measurements are different.

Thus, when a difference performed between the RHCP and LHCP pseudo range measurements exceeds a threshold, it is likely that the receiver is in a multipath propagation environment. This patent application further proposes to use a second criteria, based on a Carrier over Noise ratio measurement, to detect multipaths.

However, the referenced patent application does not solve the problem of detecting the tracking of a reflected path instead of the direct path from the signal acquired on the RHCP antenna. Indeed, when a tracking loop dedicated to the RHCP signal tracks a reflected path of the positioning signal, the difference between the pseudo range measurements acquired from the RHCP and LHCP antenna is almost null. The receiver will then consider that the signal is acquired on the direct path, and put a high level of confidence in a pseudo range measurement which is erroneous.

Actually, a multipath propagation environment will only be detected when the tracking loop processing the signal acquired on the RHCP antenna is locked on the direct path. There is no indication on whether or not the tracking position over the RHCP signal is right or wrong.

The second criteria, based on the C/N measurement, assumes that the antenna gain between RHCP and LHCP signal is constant with respect to the off-boresight angle, which incorrect, as can be observed on FIG. 1. Depending on the bore off sight angle, this gain can go from –40 dB to 40 dB. It is therefore not possible to rely on this criterion, which will raise a high level of false alarms.

As a consequence, the referenced patent application does not solve the problem of distinguishing between the tracking of a direct path and the tracking of a reflected path in a GNSS receiver.

SUMMARY OF THE INVENTION

It is an object of the invention to describe a method, and associated receiver, for mitigating multipaths in a GNSS receiver. The method gives information about the tracking loops being locked over reflected paths of the positioning signal. The invention is based on the use of two antennas polarized differently, each antenna being associated to a receiver chain, and aims at improving multipath detection techniques of prior art by using both pseudo range measurements and associated quality indicators to determine a reliability of pseudo range measurements calculated from the signals received on the co-polar antenna.

To this end, the invention discloses a GNSS receiver for calculating a position from positioning signals transmitted by a plurality of GNSS transmitters. The receiver comprises a first signal acquisition element having a first polarization and is configured to process the signals received on said first signal acquisition element to calculate first pseudo range measurements. The receiver further comprises a second signal acquisition element having a second polarization different from the first polarization, and is configured to process the signals received on said second signal acquisition element to calculate second pseudo range measurements and associated quality indicators. The receiver also comprise a calculation circuit configured to:
- select at least one of the second pseudo range measurements depending on the quality indicators, and compare said at least one second pseudo range measurement selected with the first pseudo range measurement acquired from a same GNSS transmitter, and
- select at least three pseudo range measurements from the first pseudo range measurements based on the comparison results to calculate a position.

According to one embodiment of a GNSS receiver according to the invention, the first signal acquisition element is a right hand circularly polarized antenna.

According to another embodiment of a GNSS receiver according to the invention, the first and the second signal acquisition elements are separate antenna outputs of a dual-polarized antenna, one of the antenna outputs being right hand circularly polarized, the other antenna output being left hand circularly polarized.

According to one embodiment, selecting at least one of the second pseudo range measurements is done by selecting a defined number (N) of second pseudo range measurements in a descending order of their quality indicators. Advantageously, the number of second pseudo range measurements considered is dynamically adapted.

According to another embodiment, selecting at least one of the second pseudo range measurements is done by selecting second pseudo range measurements to which the associated quality indicator is above a threshold.

According to still another embodiment, the receiver is further configured to calculate quality indicators associated to the first pseudo range measurements, and selecting at least one of the second pseudo range measurements is done by performing a combination between the quality indicators associated to the first pseudo range measurements and the quality indicators associated to the second pseudo range measurements.

In an embodiment of a GNSS receiver according to the invention, the selection of the at least three first pseudo range measurements may be done by selecting all the first pseudo range measurements, and removing from the selection pseudo range measurements that are larger or substantially equal to the selected second pseudo range measurements acquired from the same GNSS transmitter.

Advantageously, the receiver is further configured to detect a tracking loop in charge of computing a first pseudo range measurement when said first pseudo range measurement is not selected for the position calculation.

Depending on the embodiment, the quality indicators may be selected among a carrier over noise ratio, a signal over noise ratio, a signal over interference plus noise ratio, a signal power level, a likelihood measurement with a reference signal, or any combination of the above measurements. Advantageously, these quality measurements may be further adjusted using weighting factors depending, for instance, of the known position of the satellites, as given in the ephemeris field of the navigation messages.

The invention further concerns a method for calculating a position from positioning signals transmitted by a plurality of GNSS transmitters, in a GNSS receiver comprising a first signal acquisition element having a first polarization and a second signal acquisition element having a second polarization different from the first polarization. The method comprises:
- a first step of calculating first pseudo range measurements from signals received over the first signal acquisition element,
- a second step of calculating second pseudo range measurements and associated quality indicators from signals received over the second signal acquisition element,
- a third step of selecting at least one of the second pseudo range measurements depending on the quality indicators, and comparing said at least one pseudo range measurement selected with the first pseudo range measurement acquired from a same GNSS transmitter,
- a fourth step of selecting at least three pseudo range measurements from the first pseudo range measurements, based on the comparison results of the second step, and
- a fifth step of calculating a position using the at least three pseudo range measurements selected in the third step.

BRIEF DESCRIPTION OF THE DRAWINGS

The invention will be better understood and its various features and advantages will emerge from the following description of a number of exemplary embodiments and its appended figures in which:

FIG. 4a to 4e illustrate a typical case of operation, by way of example, according to various embodiments of the invention;

The examples disclosed in this specification are only illustrative of some embodiments of the invention. They do not in any manner limit the scope of said invention which is defined by the appended claims.

DETAILED DESCRIPTION OF THE INVENTION

In what follows, it will be considered that a PVT calculation requires four pseudo range measurements. However, when the altitude information is not required (as for example if acquired by another sensor of the receiving equipment, or already known), only three pseudo range measurements are needed, and the invention must be adapted accordingly.

Figure 2:
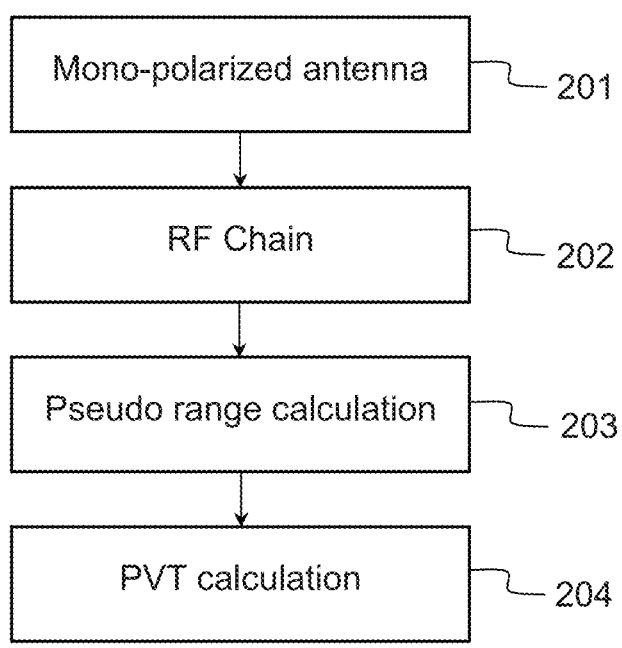
FIG. 2 presents an overview of a GNSS receiver according to the prior art.

FIG. 2 presents an overview of a GNSS receiver according to the prior art. Said receivers generally comprise one single-polarized antenna 201, typically a RHCP antenna, and a RF chain 202 to filter and convert the signal from carrier frequency to baseband or intermediate frequency, and perform the analog to digital conversion.

The digital signal is processed by a calculation circuit such as a software reprogrammable calculation machine (like a microprocessor, a microcontroller, or a digital signal processor (DSP)) or a dedicated calculation machine (as for example a Field Programmable Gate Array (FPGA), or an Application Specific Integrated Circuit (ASIC)). Any intermediate combination of analog and digital components is possible. This calculation circuit performs the pseudo range measurements calculation 203. It includes performing correlations between the received signal and local replicas of the signals to isolate the positioning signals transmitted by the various satellites, tracking a synchronization position in at least four tracking loops associated to distinct positioning signals, and calculating the associated pseudo ranges.

Finally, using the pseudo ranges, the receiver calculates a PVT measurement 204. Advantageously, a quality level of the pseudo range measurement can be calculated, to be used as a weighting factor when computing the PVT value. This quality level can be based on a measurement of the received power level, signal over noise ratio (SNR), or any other suitable quality indicator.

Figure 3:
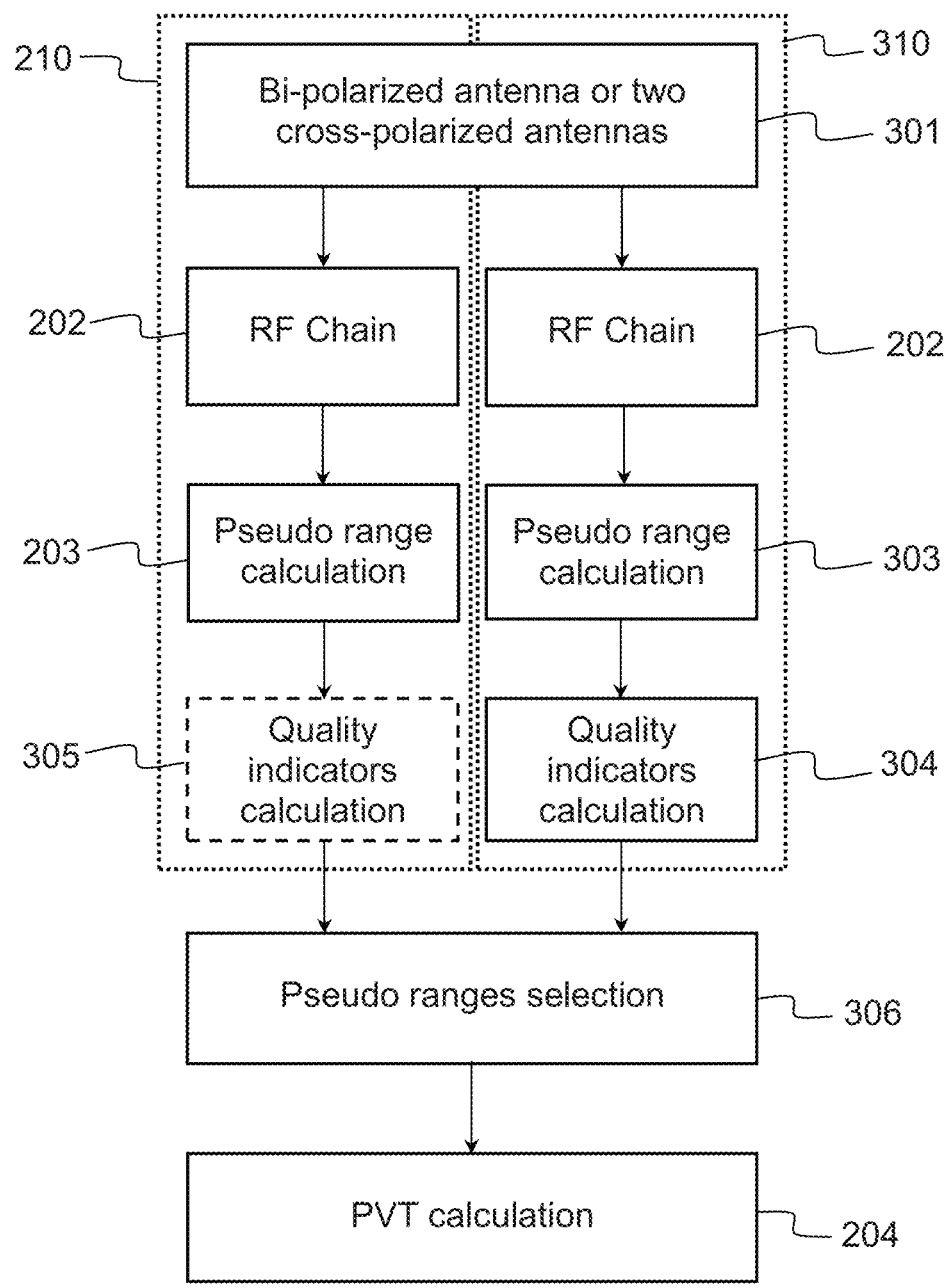
FIG. 3 presents an overview of a GNSS receiver according to the invention.

FIG. 3 presents an overview of a GNSS receiver according to the invention.

The GNSS receiver according to the invention comprises two acquisition elements 301, to independently receive signals with a different polarization. Ideally, the first antenna is a co-polar RHCP antenna, and the second antenna is a cross-polar LHCP antenna, as GNSS signals are RHCP signals. This configuration is the most favorable in terms of performances, and is the one that is considered in the following description. However, least favorable antenna configurations in terms of performances are not excluded as they can be more favorable in terms of deployment, like for example the use of a RHCP antenna along with a linearly polarized antenna, which is well particularly adapted for integration in a cell phone, even if receiving LHCP signals over a linearly polarized antenna suffers a 3 dB signal loss. The relevant characteristic of the second antenna is that it shows an ellipticity ratio, or an axial ratio, that is different from the first antenna, as for instance having co-polar and cross-polar gains that are different from the first antenna (preferably inferior for the co-polar and superior for the cross-polar), or co-polar antennas directed in different directions.

The acquisition elements can be separate antennas oriented in the same direction, or two separate antenna outputs of a single dual-polarized antenna. Such an antenna can be obtained for instance associating a dual linearly polarized radiating element (as for instance a patch antenna, a dielectric resonator antenna or crossed dipoles antennas) with a 90° coupler. The advantages of the dual-polarized antenna are that both signals are received with a common phase center, and that the space occupied by the dual circularly polarized antenna in the receiver is reduced compared to the use of two orthogonally polarized antennas.

The receiver according to the invention comprises two RF chains 201 and 202, respectively associated to each antenna output. These RF chains are similar to those of FIG. 2, and play the same role. In an alternate embodiment, the receiver according to the invention can comprise a single RF chain that processes alternately signals acquired from the RHCP and LHCP antennas. The switching rate ratio between the two antennas is not necessarily 50/50, an emphasis may be put to the signal acquired from the RHCP antenna, that requires a higher accuracy than the signal acquired from the LHCP antenna.

The outputs of the RF chains are processed to calculate pseudo range measurements (203, 303), that are measurements of the estimated distance between the receiver and satellites, in an identical manner to what is done in receivers known from previous art. At least four pseudo ranges are calculated in each branch of the receiver from tracking loops correlating signals received over locally generated replicas of the signals, selecting from the output of a correlation function a tracking position, and using the tracking position along with the information transmitted in the navigation message to calculate a pseudo range measurement.

As most of the receivers comprise a large number of tracking loops dedicated to the pseudo range measurements calculations (at least 24 nowadays), the invention does not necessarily require to duplicate said tracking loops, but to affect at least some of the already existing tracking loops to the tracking of signals acquired from the co-polar (RHCP) antenna.

Practically, in standard GNSS receivers, part of the tracking loops are locked on signals, while the others are in acquisition phase in case new satellites come in line of sight. It is not necessary that the acquisition phase is also performed over the signals acquired from the cross-polar antenna, which limits the number of tracking loops that have to be assigned to the signals acquired from this antenna.

In addition to the calculation of the pseudo ranges, quality indicators 304 are calculated for each of the pseudo range measurements on the cross-polar (LHCP) branch 310 of the receiver. Depending on the embodiment of the invention, quality indicators 305 associated to the pseudo range measurements 203 calculated over the co-polar (RHCP) branch of the receiver can be calculated. These quality indicators give information about the reliability associated to each of the pseudo range measurements based on, for instance, a carrier over noise or signal over noise ratio (SNR), a signal over interferer plus noise ratio (SINR), a received power level, a likelihood measurement between the expected correlation function output and the processed correlation function output, the output of a code minus carrier computation, or any other suitable indicator for estimating the noise level on the pseudo range measurements, and classifying these measurements according to their reliability.

These pseudo range measurements can be further used to feed the PVT computation algorithm 204 if required.

The receiver according to the invention further comprises some logic 306, to determine which of the pseudo ranges determined from the signals received by the co-polar antenna are likely to come from direct propagation paths, and which have a high probability to result from the tracking of a reflected path. This selection is based on the co-polar and cross-polar pseudo range measurements, and the quality indicators associated to the cross-polar pseudo range measurements.

As in state of the art receivers, pseudo range measurements calculated considering the signals received on the co-polar antenna are compared to the pseudo ranges calculated considering the signals received on the cross-polar antenna. However, contrary to state of the art receivers, this comparison is not used to determine if the propagation environment comprises some multipath reflections, but to detect if pseudo ranges are calculated from multipath reflections of the signals acquired on the RHCP antenna. In order to avoid the risk of false alarms, the comparison is not systematic, but depends on the quality indicators of at least the cross-polar pseudo range measurements, and potentially other criteria, like the number of pseudo range measurements available.

Based on these comparisons, pseudo range measurements are selected from the pseudo range measurements acquired on the co-polar antenna (RHCP), to compute a PVT calculation. Hence, pseudo ranges that are likely to come from reflections of the positioning signal are excluded from the PVT calculation, thus increasing its accuracy. Various embodiments to perform this selection are described later on in the description.

In order to perform a PVT calculation, the receiver requires at least four pseudo range measurements. Additional pseudo range measurements can be used to improve the accuracy of the PVT calculation. Thus, the pseudo range selection circuit 306 removes from the selection pseudo range measurements calculated over the co-polar (RHCP) branch of the receiver as long as the number of the pseudo range measurements that are left is higher than or equal to four.

The selected pseudo ranges are then normally processed for PVT calculation 204, as in state of the art GNSS receivers.

The receiver according to the invention requires additional radio modules compared to standard GNSS receivers: at least a cross-polar antenna and the associated RF chain, in order to process cross-polarized signals which are normally not considered in standard GNSS receivers, or a mechanism to use a single RF chain alternately with signals acquired from the RHCP and LHCP antenna. However, this architecture can be reduced by using dual-circular polarized antennas, and can already be found in some receivers. The selection logic of the receiver according to the invention does not require implementing complex signal processing algorithms, as for example most of the multipath mitigation techniques, which require massive sets of correlators to detect and process multipaths. Furthermore, the invention can work in conjunction with such multipath mitigation techniques, or other signal processing algorithms, as in the invention, the RHCP signal can be processed as in any GNSS receiver.

The pseudo range selection part 306 of the receiver is based on a classification of the pseudo ranges acquired from the cross-polar antenna considering the associated quality indicators, and a comparison between the co-polar part of the receiver and the cross-polar part. Thus, the implementation complexity of the multipath mitigation technique according to the invention is very low and the computation can be performed in real time.

The GNSS receiver, according to the invention may be decomposed into various elements. In the case of multiple antennas for example, one antenna may be connected to an RF chain 201 which is part of the main receiver and one antenna may be connected to an RF chain 202 which is part of a secondary receiver. Pseudo range calculations 201 and 303 may be part of respectively the main receiver and secondary receiver or they may be both part of the main receiver. Quality indicators 305 and 304 may also be part of the main receiver and secondary receiver, respectively, or may be both part of the main receiver. In some embodiments one hardware element of the GNSS receiver can perform both functions such as 304 and 305, or 303 and 203, or 202 and 201. To illustrate one embodiment, the main receiver is a smart phone having a cross-polarized antenna. The secondary receiver is an external module having a cross-polarized antenna. The secondary receiver connects to the main receiver through a connection means such as Bluetooth or Wi-Fi. The secondary receiver contains at least an RF chain. Measurements may be sampled at the end of the RF chain and transmitted to the main receiver. In another embodiment, the main receiver is a smart phone having a linear polarized antenna. The secondary receiver has a bi-polarized antenna and one RF chain or two crossed polarized antennas and two RF chains. Measurements can be transmitted to the main receiver. In another embodiment one secondary module has an RHCP antenna and an RF chain and a second secondary module has an LHCP antenna and an RF chain.

FIGS. 4a, 4b, 4c, 4d and 4e illustrate a typical case of operation, by way of example, according to various embodiments of the invention. Other values than those presented in these figures could be used.

Figure 4A:
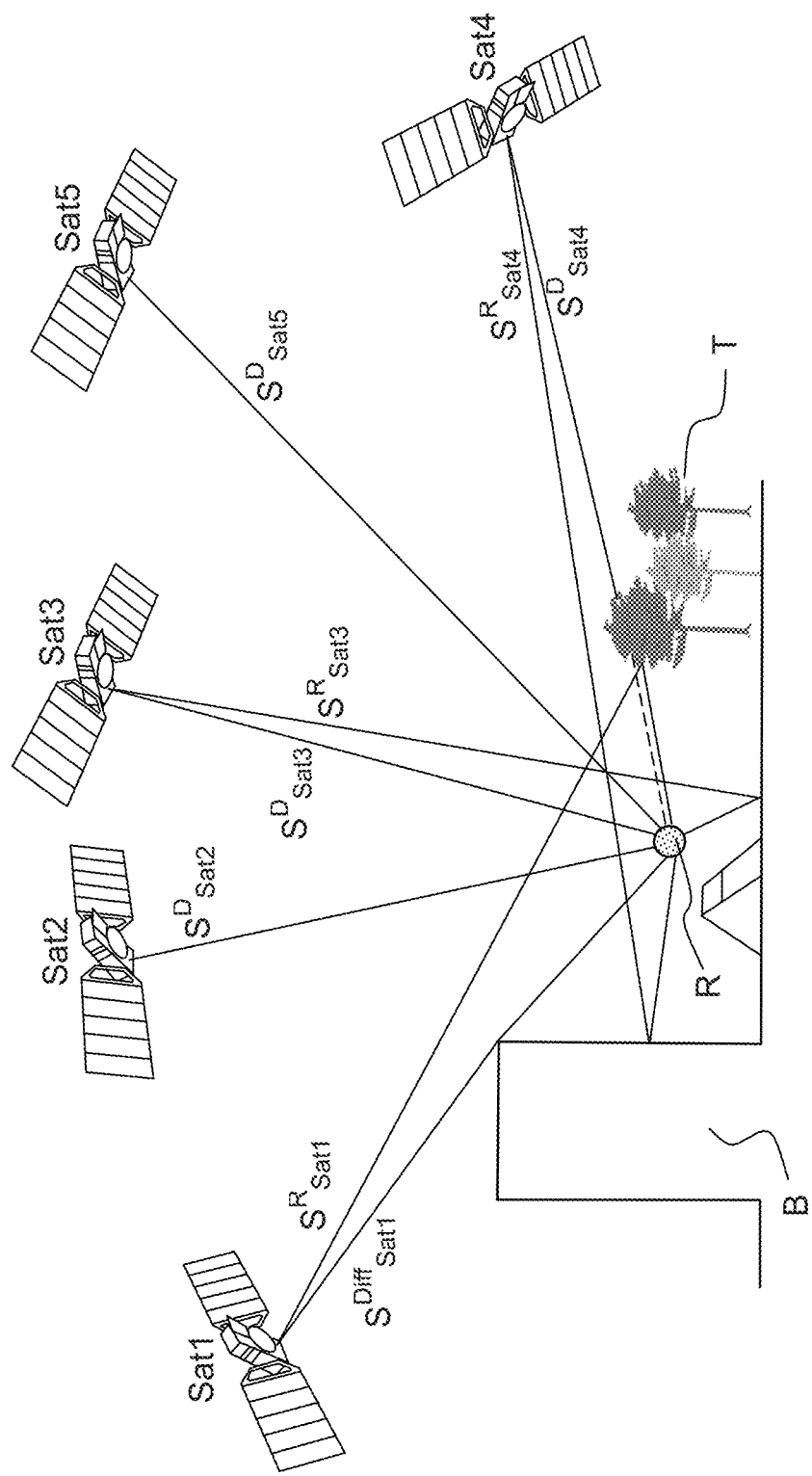
Figure 5:
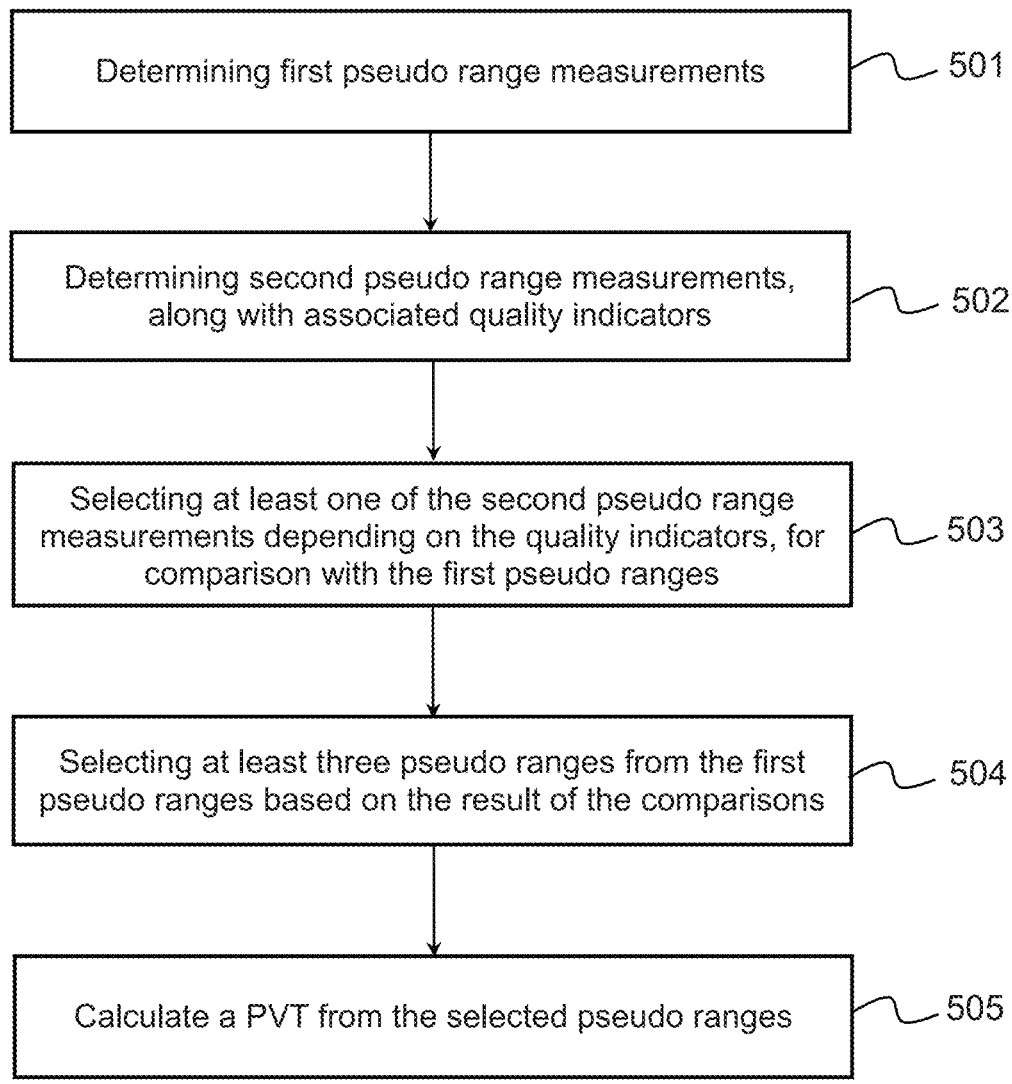
FIG. 5 represents a flow chart of a method according to the invention, for multipath mitigation in a GNSS receiver.

In FIG. 4a are five satellites (Sat1 to Sat5), each of them transmitting a GNSS signal, and a receiver R in an environment that comprises a building B and trees T.

From the receiver, satellite 1 is not in line of sight. However, it can receive the positioning signal transmitted by this satellite from two different paths:

$S_{sat1}^{Diff}$, where the signal is diffracted over the corner of the building. This path is not a direct path, but is close to the direct path (in terms of propagation time), and is the signal over which the receiver is expected to synchronize its tracking loops. An electromagnetic wave diffracted over the edge of a building is linearly polarized. Thus, $S_{sat1}^{Diff}$ is linearly polarized, which means that, when received over a circularly polarized antenna, the signal will suffer an additional 3 dB loss.

$S_{sat1}^{R}$, where the signal is reflected over the trees. Due to the reflection, the signal is LHCP.

From the receiver, satellites 2 and 5 are in line of sight. The signals transmitted by these satellites are received on their direct path only ($S_{sat2}^{D}$ and $S_{sat5}^{D}$), and are RHCP.

From the receiver, satellite 3 is in line of sight. The signal is received considering a direct path $S_{sat3}^{D}$, RHCP, and a reflected path $S_{sat3}^{R}$, LHCP, at the rear of the antenna.

From the receiver, satellite 4 is in line of sight. The signal is received from two paths: a direct path $S_{sat4}^{D}$, RHCP, wherein the signal is attenuated by the trees, and a reflected path $S_{sat4}^{R}$, LHCP, after being reflected over building B.

FIG. 4b presents the antenna gain and attenuation associated to each of the paths described in FIG. 4b, for each of the antennas.

Figure 1:
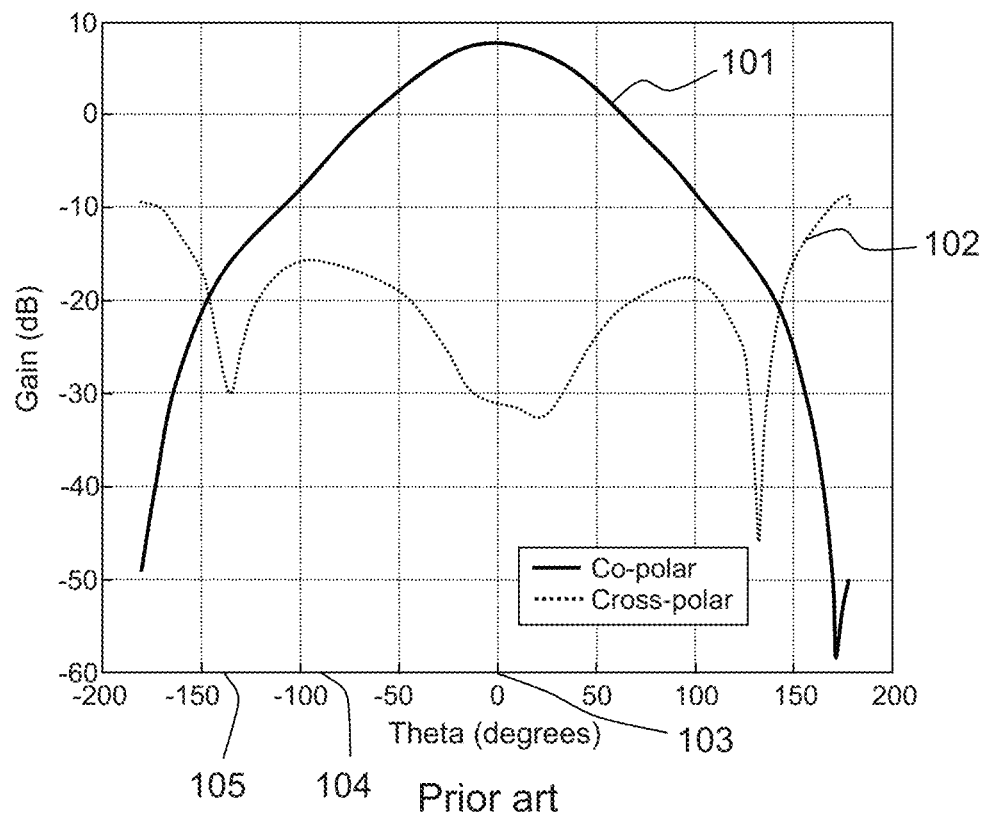
FIG. 1, already described, illustrates a radiation pattern of an antenna in a GNSS receiver as known from the prior art.

The antenna gains are classified into five levels: Very Low (VL), Low (L), Medium (M), High (H) and Very High (VH). The antenna gain merely depends on the polarity and angle of arrival of the received signal, as shown in FIG. 1. Similarly, the attenuation is classified into three levels: Low (L), Medium (M) and High (H).

In this example, it has been considered that the attenuation due to reflections in trees, diffraction, or the crossing of trees is higher than the attenuation due to a reflection over a building or the ground.

Focusing on the co-polar antenna, and considering the angle of arrival of the direct paths $S_{sat2}^{D}$, $S_{sat3}^{D}$ and $S_{sat5}^{D}$, the antenna gains are very high. For direct paths $S_{sat1}^{Diff}$, and $S_{sat4}^{D}$, which are respectively linearly polarized and co-polarized and suffer from a lower angle of arrival, the antenna gain is slightly lower but still high. Likewise, the reflected signal $S_{sat3}^{R}$, which is cross-polarized, arrives to the antenna with a very low off-boresight angle, and thus benefits from a high antenna gain. To a lesser extent, the same behavior can be observed on signals $S_{sat1}^{R}$ and $S_{sat4}^{R}$.

Focusing now on the cross-polarized antenna, the gain of the reflected signal received with a medium off-boresight angle is high. This is the case for instance for $S_{sat1}^{R}$ and $S_{sat4}^{R}$. On the contrary, signals received from direct paths having a high off-boresight angle have a very low antenna gain.

On FIG. 4c, the various signals are classified, for each antenna, based on their relative power level, taking into account the antenna gain and signal attenuation. Signals at the top of the table are the one received with the highest power level.

Focusing on the signal received from satellite 4 on the co-polar antenna, it can be observed that the reflected path has a higher power level than the direct path, which is masked by trees. Thus, there is a high probability that a tracking loop locks over the reflected path.

On FIG. 4c signals on which the receiver tracking loops are locked are indicated. Pseudo range measurements calculated by the receiver are based on these signals.

On FIG. 4d are represented the pseudo ranges available at the receiver, along with the associated quality indicators. The pseudo range measurements are classified based on their quality indicators. Depending on the embodiment of the invention, quality indicators are not calculated considering the co-polar branch of the receiver. Thus, only the classification of the cross-polar pseudo range measurements is required.

In the calculation circuit (306 in FIG. 3), at least some of the pseudo range measurements calculated on the co-polar (RHCP) branch of the receiver are selected for the PVT calculation. This selection is based on a comparison between the pseudo ranges determined using the co-polar antenna, and the pseudo ranges determined using the cross-polar antenna. The criteria for detecting a tracking over reflected paths is that, for a signal acquired from a same satellite, the co-polar pseudo range measurement is higher or substantially equal to the cross-polar pseudo range measurement. Indeed, when the pseudo range measurement acquired from the cross-polar antenna is lower than the pseudo range measurement acquired from the co-polar antenna, there is no doubt that the co-polar antenna is tracking a reflected path of the signal, and this measurement shall be removed from the PVT calculation. When they are substantially equal (substantially means that the difference between these measurements is within the margin of error, that can be for instance limited to one sample or less at the sampling frequency of the receiver), either the co-polar branch of the receiver is tracking a reflected path of the signal, or the cross-polar branch of the receiver is tracking the direct path. As a consequence, there is significant probability that the co-polar pseudo range measurement has to be removed from the PVT computation. When the cross-polar pseudo range measurement is higher than the co-polar measurement, there is a high probability that the co-polar branch is tracking the direct path of the signal. However, the criteria based on a comparison of the pseudo ranges is not sufficient in itself to determine which pseudo range measurements shall be removed from the PVT calculation, and the quality indicators associated with the pseudo range measurements must be taken into consideration. For instance, when only one direct path is present, as for $S_{sat2}^{D}$, co-polar and cross-polar pseudo ranges are equal but removing the co-polar pseudo range measurement from the PVT calculation would be an issue, as it comes from a direct propagation path of the signal, and is particularly accurate.

Among the pseudo ranges determined using the cross-polar (LHCP) antenna, those associated to a high quality indicator are likely to be determined from a reflected signal, while those associated to a low quality indicator can result from the tracking of a direct path of the signal. In the first embodiments of the invention, quality indicators 304 associated to pseudo ranges acquired in the cross-polar branch of the receiver are considered. This allows to select in priority the pseudo range measurements that are the most likely to come from a reflected path of the positioning signals, for comparison with the co-polar pseudo range measurements.

Back to signal $S_{sat2}^{D}$ received in the cross-polar branch, the quality indicator associated to the pseudo range measurement is low, as the gain of a cross-polar antenna facing a co-polar signal with a low off-boresight angle is very low (from −15 dB to −30 dB on FIG. 1). This pseudo range measurement will be associated to a low quality indicator. But in the co-polar branch of the receiver, the pseudo range measurement computed from the same signal will have a high quality.

On the contrary, for signal $S_{sat4}^{R}$, the quality indicators associated to the co-polar and cross-polar pseudo range measurements are medium, as the signal is reflected on a wall or attenuated by trees, and received almost horizontally in both cases.

According to an embodiment of the invention, the receiver is configured to compare the N pseudo ranges of the cross-polar antenna having the highest quality indicators with the pseudo ranges acquired using the co-polar antenna. In the example, considering N=2, the pseudo range measurements selected for comparison with the first pseudo range measurements are those calculated from the satellites 4 and 1. These are the one that have the highest probability of being associated to the tracking of a reflected path.

Comparing these pseudo ranges with those measured using the co-polar (RHCP) antenna, it can be determined that the pseudo range measurement acquired from satellite 1 on the co-polar antenna does not come from a reflected path of the signal, as the cross-polar pseudo range measurement $PR_{sat1}^{R}$ is higher than the co-polar pseudo range measurement $PR_{sat1}^{Diff}$.

On contrary, the pseudo range measurements $PR_{sat4}^{R}$ calculated in each branch of the receiver from the fourth satellite are substantially equal. Thus, pseudo range measurement $PR_{sat4}^{R}$, acquired from satellite 4, is likely to be based on the tracking of a reflected path.

In that specific case, as five co-polar pseudo range measurements are available, one can be removed from the PVT calculation. Consequently, the pseudo range $PR_{sat4}^{R}$ coming from satellite 4 will not be considered to process the PVT calculation.

By considering only N pseudo range measurements acquired on the cross-polar (LHCP) antenna, pseudo range measurements that are calculated over direct paths of the signal, such as $PR_{sat2}^{D}$ in the example, have a low probability to be considered, which increase the robustness of the selection processing. Choosing a lower value of N leads to a smaller correction but guaranties a lower probability of rejecting pseudo ranges detected from direct paths, while choosing a higher value of N leads to a higher capacity of rejecting pseudo ranges calculated from reflected paths, but with a higher probability to reject pseudo ranges calculated from direct paths. The choice of N is therefore an implementation choice that will impact the receiver's accuracy.

Advantageously, the number N of pseudo range that are considered can be dynamically adjusted, so that it fits the evolution of the propagation environment, like for instance the number of satellites in line of sight, the number of multipath reflections observed, the required accuracy, the quality indicators, or the received signals power level.

The N pseudo range measurements, selected from the cross-polar pseudo range measurements to be compared with co-polar pseudo range measurements, can be chosen in a descending order of their quality indicator. Thus, the pseudo ranges used to perform the comparison are in priority to those that are the most likely to be calculated from a reflected path, which further reduces the probability to raise false alarms.

According to another embodiment of the invention, the quality indicators of the pseudo range measurements retrieved on the cross-polar (LHCP) branch of the receiver are compared to a threshold. Pseudo range measurements that are above the threshold are then compared with those acquired from the same satellite on the co-polar branch (RHCP) of the receiver, so as to remove the pseudo ranges resulting from a reflected path from the PVT calculation. Of course, this processing is done so that at least four signals are transmitted to the PVT calculation. The pseudo ranges of the cross-polar branch can still be selected in a descending order of their quality indicators. The sensitivity and performance of the algorithm depends on the threshold value. Back to FIG. 4d, by setting a threshold value corresponding to a medium quality indicator, only pseudo ranges calculated from satellite 1 and 4 will be considered, which prevents from rejecting pseudo range measurements calculated from satellites 2, 3 or 5.

Finally, in another embodiment, the criteria for selecting the cross-polar pseudo range measurements that are compared to the co-polar pseudo range measurements consists of a combination of the co-polar and cross-polar quality indicators. This combination can be carried out in the form of a ratio or a difference calculation. When the modulus of the ratio is low, or when the difference is close to or lower than zero, it means that the signal is received with an equivalent quality in each branch of the receiver. There is thus a probability that a pseudo range measurement is acquired from the tracking of a reflected path. As a consequence, the associated co-polar and cross-polar pseudo range measurements shall be compared to determine whether or not the co-polar measurement shall be taken into consideration for the PVT calculation.

On the contrary, when the modulus of the ratio, or the difference, is high, there is a high probability that the signal only comprises one path. The associated co-polar measurement shall not be excluded from the position calculation.

A threshold must be put, to determine the selection of the cross-polar pseudo ranges that are to be compared with the first pseudo range in order to determine if they result of a tracking over a reflected path of the signal.

FIG. 4e illustrates this embodiment, where the comparison is a difference between the co-polar quality indicator measurements and the cross-polar quality indicators measurements. The quality indicators are expressed as low, medium, or high, but they can also be expressed in dB, or any other relevant unit. For pseudo ranges acquired over satellites 2, 3 and 5, the quality indicators associated to the co-polar pseudo range measurement are high, while the corresponding quality indicator determined over the cross-polar pseudo range measurement are low. Therefore, the difference is high. For satellites 1 and 4, the quality indicator measurements are medium on the co-polar and cross-polar antennas. Therefore, the difference is low (close to 0). By setting a threshold to medium (for instance), only the pseudo range measurements associated to satellites 1 and 4 will be considered for comparison in order to determine if they are to be used for the PVT computation. This method allows not to erroneously reject pseudo range measurements computed over line of sight signals.

All of the previous embodiments can be mixed, for instance by selecting for comparison the N pseudo range measurements having the highest cross-polar quality indicators, provided that they are above a first threshold and that the co-polar quality indicators of the corresponding pseudo range measurements are under a second threshold, or selecting for comparison the N pseudo range measurements having quality indicator differences that are under a first threshold provided that the cross-polar quality indicator is above a second threshold.

Advantageously, the quality indicators 305 calculated over the signal received in the co-polar branch of the receiver are considered. Co-polar pseudo range measurements associated to quality indicators that exceed a threshold are directly selected for the position calculation, regardless to the value of the corresponding cross-polar pseudo range measurement. In the example, that would be the case of $PR_{sat2}^D$, $PR_{sat3}^D$ and $PR_{sat5}^D$, which are direct, non attenuated paths coming with a low off-boresight angle.

According to another embodiment of the invention, when a pseudo range measurement acquired on the co-polar (RHCP) branch of the receiver is identified as being based on the tracking of a reflected path, the information is further propagated to the tracking loop, so that it stops tracking the multipath, and restarts its acquisition phase or modifies its tracking position.

The invention further lies on a method, for detecting and suppressing pseudo ranges resulting from the tracking of a reflected path of a positioning signal in a GNSS receiver comprising two antennas circularly polarized with orthogonal polarizations, or one dual-polarized antenna with two separate antenna outputs.

The method comprises a first step 501 of calculating first pseudo range measurements over the signal received on the co-polar antenna, second pseudo range measurements over the signal received on the cross-polar antenna, and a quality indicator associated to each of the second pseudo range measurements.

The method further comprises a second step 502 of selecting at least one of the said second pseudo range measurements depending on the quality indicators, and comparing said selected pseudo range measurements with the first pseudo ranges obtained from the same GNSS transmitter. The selection of the second pseudo range measurements may be based on a predefined number of second pseudo range measurements in descending order of their quality indicators, based on the comparison between the quality indicators and a threshold, based on a radio or difference measurement between the quality indicators associated to co-polar and cross-polar or based on a mix of these criteria.

The method further comprises a third step 503 of selecting at least three pseudo range measurements from the first pseudo range measurements to calculate a position, based on the results of the comparisons. The selected pseudo ranges are the first pseudo range measurements, from which are removed in priority pseudo ranges that substantially match the comparison with the pseudo range selected during the second step of the method. Advantageously, the pseudo range measurements removed are those that substantially match the comparison with the pseudo range measurements selected during the second step, and amongst them those that have the highest quality indicators.

Finally, the method comprises a fourth step 504 of calculating a position from the selected pseudo ranges.

The device and method according to the invention allow detecting and removing from the PVT calculation pseudo range measurements that result from the tracking of paths that have been reflected an odd number of times, with a low probability to raise false alarms.

The invention has a low implementation complexity, beside the addition of a cross-polar antenna and the associated RF chain (or an antenna switch when a single RF chain is used to acquire the signal received on both antennas), and can be processed in real time.

The invention is useful to increase the accuracy of a GNSS receiver, in particular in urban environments, where multiple path reflections of the positioning signal are prone to occur, and where a high accuracy is required. The invention can be dynamically adapted to follow the variations of the propagation environment (number of satellites in line of sight, variance over the determined position, etc. . . . ).

The invention can be used in combination with other multipath mitigation techniques.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A GNSS receiver for calculating a position from positioning signals transmitted by a plurality of GNSS transmitters, said receiver comprising a first signal acquisition element having a first polarization and being configured to process the signals received on said first signal acquisition element to calculate first pseudo range measurements, the receiver further comprising a second signal acquisition element having a second polarization different from the first polarization, and being configured to process the signals received on said second signal acquisition element to calculate second pseudo range measurements and associated quality indicators, said receiver comprising a calculation circuit configured to:

select at least one of the second pseudo range measurements depending on the quality indicators, and compare said at least one second pseudo range measurement selected with the first pseudo range measurement acquired from a same GNSS transmitter, and select at least three pseudo range measurements from the first pseudo range measurements based on the comparison results to calculate a position.

2. The receiver of claim 1, wherein the first signal acquisition element is a right hand circularly polarized antenna.

3. The receiver of claim 1 wherein the first and the second signal acquisition elements are separate antenna outputs of a dual-polarized antenna, one of the antenna outputs being right hand circularly polarized, the other antenna output being left hand circularly polarized.

4. The receiver of claim 1, wherein selecting at least one of the second pseudo range measurements is done by selecting a defined number (N) of second pseudo range measurements in a descending order of their quality indicators.

5. The receiver of claim 4, wherein the number of second pseudo range measurements considered is dynamically adapted.

6. The receiver of claim 1, wherein selecting at least one of the second pseudo range measurements is done by selecting second pseudo range measurements for which the associated quality indicator is above a threshold.

7. The receiver of claim 1, wherein the receiver is further configured to calculate quality indicators associated to the first pseudo range measurements, and wherein selecting at least one of the second pseudo range measurements is done by performing a combination between the quality indicators associated to the first pseudo range measurements and the quality indicators associated to the second pseudo range measurements.

8. The receiver of claim 1, wherein the selection of the at least three first pseudo range measurements is done by selecting all the first pseudo range measurements, and removing from the selection pseudo range measurements that are larger or substantially equal to the selected second pseudo range measurements acquired from the same GNSS transmitter.

9. The receiver of claim 1, wherein the receiver is further configured to detect a tracking loop in charge of computing a first pseudo range measurement when said first pseudo range measurement is not selected for the position calculation.

10. The receiver of claim 1, wherein the quality indicators are selected among a carrier over noise ratio, a signal over noise ratio, a signal over interference plus noise ratio, a signal power level, or a likelihood measurement with a reference signal.

11. A method for calculating a position from positioning signals transmitted by a plurality of GNSS transmitters in a GNSS receiver comprising a first signal acquisition element having a first polarization and a second signal acquisition element having a second polarization different from the first polarization, comprising:

a first step of calculating first pseudo range measurements from signals received over the first signal acquisition element, a second step of calculating second pseudo range measurements and associated quality indicators from signals received over the second signal acquisition element, a third step of selecting at least one of the second pseudo range measurements depending on the quality indicators, and comparing said at least one pseudo range measurement selected with the first pseudo range measurement acquired from a same GNSS transmitter, a fourth step of selecting at least three pseudo range measurements from the first pseudo range measurements, based on the comparison results of the second step, and a fifth step of calculating a position using the at least three pseudo range measurements selected in the third step.

* * * * *